(12) United States Patent
Xu et al.

(10) Patent No.: US 10,148,960 B2
(45) Date of Patent: *Dec. 4, 2018

(54) CHROMA QUANTIZATION PARAMETER EXTENSION

(71) Applicant: SONY CORPORATION, Tokyo (JP)

(72) Inventors: Jun Xu, Sunnyvale, CA (US); Kazushi Sato, Kanagawa (JP); Ehsan Maani, San Jose, CA (US)

(73) Assignee: VELOS MEDIA, LLC, Plano, TX (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/252,824

(22) Filed: Aug. 31, 2016

(65) Prior Publication Data

US 2016/0373753 A1    Dec. 22, 2016

Related U.S. Application Data

(63) Continuation of application No. 13/744,759, filed on Jan. 18, 2013, now Pat. No. 9,485,502.
(Continued)

(51) Int. Cl.
*H04N 7/26* (2006.01)
*H04N 19/124* (2014.01)
(Continued)

(52) U.S. Cl.
CPC ......... *H04N 19/124* (2014.11); *H04N 19/126* (2014.11); *H04N 19/13* (2014.11);
(Continued)

(58) Field of Classification Search
CPC .................................................. H04N 19/176
See application file for complete search history.

(56) References Cited

U.S. PATENT DOCUMENTS 5,523,847 A    6/1996  Feig et al.
7,295,609 B2  11/2007  Sato et al.
(Continued)

FOREIGN PATENT DOCUMENTS

CN    101502123 A    8/2009
CN    101677400 A    3/2010
(Continued)

OTHER PUBLICATIONS

Office Action for EP Patent Application No. 13738936.7, dated Jan. 24, 2017, 6 pages.
(Continued)

*Primary Examiner* — David J Czekaj
*Assistant Examiner* — Alison T Slater
(74) *Attorney, Agent, or Firm* — Chip Law Group

(57) ABSTRACT

The quantization parameters (QP) for Chroma are extended up to and more preferably to the same range as Luma QP (e.g., 0 to 51). Previous, values of Chroma QP only extended up to 39. Techniques are provided for determining extended Chroma QP values (e.g., for Cr and Cb) based on the Luma QP and picture level chroma offsets. In one preferred embodiment, slice level offsets are added making the method particularly well-suited for slice level parallel processing. The extension of Chroma QP enhances functionality, flexibility and friendliness of the High Efficiency Video Coding (HEVC) standard for various applications.

6 Claims, 4 Drawing Sheets

Related U.S. Application Data

(60) Provisional application No. 61/624,870, filed on Apr. 16, 2012, provisional application No. 61/623,884, filed on Apr. 13, 2012, provisional application No. 61/589,191, filed on Jan. 20, 2012.

(51) Int. Cl.

| | |
|---|---|
| *H04N 19/70* | (2014.01) |
| *H04N 19/149* | (2014.01) |
| *H04N 19/126* | (2014.01) |
| *H04N 19/186* | (2014.01) |
| *H04N 19/176* | (2014.01) |
| *H04N 19/147* | (2014.01) |
| *H04N 19/61* | (2014.01) |
| *H04N 19/174* | (2014.01) |
| *H04N 19/13* | (2014.01) |
| *H04N 19/159* | (2014.01) |
| *H04N 19/80* | (2014.01) |
| *H04N 19/436* | (2014.01) |
| *H04N 19/172* | (2014.01) |

(52) U.S. Cl.
CPC ......... *H04N 19/147* (2014.11); *H04N 19/149* (2014.11); *H04N 19/159* (2014.11); *H04N 19/174* (2014.11); *H04N 19/176* (2014.11); *H04N 19/186* (2014.11); *H04N 19/61* (2014.11); *H04N 19/70* (2014.11); *H04N 19/80* (2014.11); *H04N 19/172* (2014.11); *H04N 19/436* (2014.11)

(56) References Cited

U.S. PATENT DOCUMENTS

| | | | |
|---|---|---|---|
| 7,733,955 | B2 | 6/2010 | Sato et al. |
| 8,139,636 | B2 | 3/2012 | Sato et al. |
| 8,144,767 | B2 | 3/2012 | Sato et al. |
| 8,265,143 | B2 | 9/2012 | Sato et al. |
| 8,270,475 | B2 | 9/2012 | Sato et al. |
| 8,311,099 | B2 | 11/2012 | Sato et al. |
| 8,351,501 | B2 | 1/2013 | Sato et al. |
| 8,391,359 | B2 | 3/2013 | Sato et al. |
| 8,391,360 | B2 | 3/2013 | Sato et al. |
| 8,553,765 | B2 | 10/2013 | Sato et al. |
| 8,553,766 | B2 | 10/2013 | Sato et al. |
| 8,559,504 | B2 | 10/2013 | Sato et al. |
| 8,634,459 | B2 | 1/2014 | Sato et al. |
| 8,634,460 | B2 | 1/2014 | Sato et al. |
| 8,634,461 | B2 | 1/2014 | Sato et al. |
| 8,654,841 | B2 | 2/2014 | Sato et al. |
| 8,879,624 | B2 | 11/2014 | Sato et al. |
| 8,982,949 | B2 | 3/2015 | Sato et al. |
| 9,179,150 | B2 | 11/2015 | Sato et al. |
| 2010/0007532 | A1* | 1/2010 | Tanaka ................ H03M 7/4006 341/56 |
| 2010/0086025 | A1* | 4/2010 | Chen ................... H04N 19/176 375/240.03 |
| 2010/0086205 | A1 | 4/2010 | Yamagata |
| 2011/0305274 | A1 | 12/2011 | Fu et al. |
| 2012/0014455 | A1 | 1/2012 | Joshi et al. |
| 2013/0329785 | A1* | 12/2013 | Lim ..................... H04N 19/463 375/240.03 |
| 2015/0358619 | A1 | 12/2015 | Sato et al. |

FOREIGN PATENT DOCUMENTS

| | | |
|---|---|---|
| CN | 102172024 A | 8/2011 |
| JP | 2010183402 A | 8/2010 |
| KR | 10-2004-0018444 A | 3/2004 |
| WO | 2003/007126 A | 1/2003 |
| WO | 2010039734 A1 | 4/2010 |
| WO | 2011/152518 A | 12/2011 |

OTHER PUBLICATIONS

Xu, et al., "Chroma QP Extension", Joint Collaborative Team on Video Coding (JCT-VC) of ITU-T SG16 WP3 and ISO/IEC JTC1/SC29/WG11, Document: JCTVC-110400, 8th Meeting: San Jose, CA, USA Feb. 1-10, 2012, 04 pages.

Liu, et al., "Support of ChromaQPOffset in HEVC", Joint Collaborative Team on Video Coding (JCT-VC) of ITU-T SG16 WP3 and ISO/IEC JTC1/SC29/WG11, Document: JCTVC-G509, 7th Meeting: Geneva, CH, Nov. 21-30, 2011, 07 pages.

Cote, et al., "H.263+: Video Coding at Low Bit Rates", IEEE Transactions on Circuits and Systems for Video Technology, vol. 8, No. 7, Nov. 1998, pp. 849-866.

Summons to Attend Oral Proceedings Pursuant to Rule 115(1) EPC of EP Patent Application No. 13738936.7, issued on Feb. 15, 2018, 09 pages.

Bross, et al., "WD5: Working Draft 5 of High-Efficiency Video Coding", Joint Collaborative Team on Video Coding (JCT-VC) of ITU-T SG16 WP3 and ISO/IEC JTC1/SC29/WG11, 7th Meeting, JCTVC-G1103_d9, Nov. 21-30, 2011, 226 pages.

Office Action for KR Patent Application No. 10-2016-7006346, dated Apr. 16, 2018, 06 pages of Office Action and 05 pages of English Translation.

Office Action for KR Patent Application No. 10-2016-7006347, dated Apr. 16, 2018, 07 pages of Office Action and 06 pages of English Translation.

Office Action for KR Patent Application No. 10-2016-7006344, dated Apr. 10, 2018, 05 pages of Office Action and 04 pages of English Translation.

Office Action for KR Patent Application No. 10-2016-7006345, dated Apr. 10, 2018, 05 pages of Office Action and 04 pages of English Translation.

Supplementary European Search Report received for the European Patent Application No. 13738936.7, dated Jul. 8, 2015.

International Search Report and Written Opinion received for the International Patent Application No. PCT/US2013/022077, dated Apr. 5, 2013.

Japanese Patent Office, Notification of Reasons for Refusal (w/English translation), JP app. No. 2014-553437, dated Jun. 19, 2015, pp. 1-7 w/claims examiner, pp. 8-10.

Mrutyunjaya, H. "Transformation and Quantization," http://mrutyunjayahiremath.blogspot.in/2010/10/h264-transformation.html., Oct. 2, 2010, pp. 1-10.

Search Report for CN Patent Application No. 201610688983.1, dated Jul. 17, 2018, Search Report and English Translation. (CN4 SR).

Office Action for CN Patent Application No. 201610688983.1, dated Jul. 17, 2018, Office Action and English Translation. (CN4 OA).

Richardson; H.264/MPEG-4 Part 10 White Paper; www.vcodex.com H.264 / MPEG-4 Part 10: Transform & Quatization (Year: 2003).

TransformQuantResidual_H264; 2010, http:// www.lacan.upc.edu/doc/intel/ipp/ipp_manual/IPPI/ippi_ch/16/ functn (Year 2010).

Search Report for CN Patent Application No. 201610689179.5, dated Aug. 20, 2018, Search Report and English Translation. (CN3 SR).

Office Action for CN Patent Application No. 201610688997.3, dated Aug. 20, 2018, Office Action and English Translation. (CN2 1stOA)

Search Report for CN Patent Application No. 201610688997.3, dated Aug. 20, 2018, Search Report and English Translation. (CN2 SR).

Office Action for CN Patent Application No. 201610689179.5, dated Aug. 20, 2018, Office Action and English Translation. (CN3 1OA).

* cited by examiner

CHROMA QUANTIZATION PARAMETER EXTENSION

CROSS-REFERENCE TO RELATED APPLICATIONS

The present application is a continuation application of U.S. patent application Ser. No. 13/744,759, filed Jan. 18, 2013, and claims the priority from U.S. provisional patent application Ser. No. 61/589,191 filed on Jan. 20, 2012, U.S. provisional patent application Ser. No. 61/623,884 filed on Apr. 13, 2012, and of U.S. provisional patent application Ser. No. 61/624,870 filed on Apr. 16, 2012, the entire content of which is hereby incorporated by reference.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

Field of the Invention

This invention pertains generally to video encoding and decoding, and more particularly to determination of a chroma quantization parameter within video encoders and decoders.

2. Description of Related Art

The communication and storage of videos in an efficient manner requires coding mechanisms for reducing spatial and temporal redundancies. Although a number of coding techniques exist, ongoing efforts are directed at increasing efficiencies of these enCOder/DECoders (codecs) which respectively compress and decompress video data streams. The purpose of codecs is to reduce the size of digital video frames in order to speed up transmission and save storage space. Video coding advances made over the years have collectively contributed to the high levels of coding efficiency provided by state-of-the-art codecs. It is desired, however, that coding be performed at still higher efficiencies to further decrease video bit rates.

The latest of these developing coding standards is referred to as High Efficiency Video Coding (HEVC), from the Joint Collaborative Team on Video Coding (JCT-VC), which is a joint effort of the MPEG and VCEG standardization committees. HEVC employs Coding Unit (CU) structure, whose main difference from a macroblock structure (e.g., in previous MPEG-2 or AVC codecs) is that instead of a fixed size (e.g., 16×16), the size can vary up to 128×128. One Coding Tree Unit (CTU) represents both flat area and busy area, whereby providing a single QP value for one CTU is insufficient for obtaining high levels of subjective quality. Accordingly, HEVC partitions the CTU into Coding-Units (CU), each of which are represented by their own QPs which can differ from one CU to another.

The current Chroma QP derivation process in HEVC (e.g., HM 5.0) replicates that of the H.264/AVC specification as shown in Table 1. For QP values in the range of 0 to 29 a linear relationship ($QP_C = QP_Y$) is followed, whereas a nonlinear relationship is followed for higher QP values. Chroma QP also saturates at a maximum value of 39 without any consideration of the color format that may be used. It will be noted that this table actually defines the relationship between Luma and Chroma at different quality levels.

However, limiting Chroma QP in the range of [0, 39] has several disadvantages.

BRIEF SUMMARY OF THE INVENTION

In the high efficiency video coding (HEVC) standard test model HM 5.0, Chroma QP can only take values in the range of [0, 39]. The present invention extends Chroma QP, up to and including the range of [0, 51] to enhance functionality, flexibility and friendliness of the HEVC coding standard for various potential applications. These applications include rate control at low bit-rate, while providing the flexibility to obtain a desired performance balance point between luma and chroma, and for handling video sources with different color formats (e.g., RGB).

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

The current HEVC standard (HM 5.0) limits QP values in a linear range up to 29 and a nonlinear range up to 39. There are a number of problems which arise from limiting QP in this manner.

Firstly, problems in the bit consumption for luma and chroma arise when the bit-rate is very low. Experimental results using HM 5.0 show that at high QPs (e.g., for QP equal to 38, 42, 46, 50) luma and chroma consume almost the same number of bits for their residual coding, which is significantly different from what is observed for the common test conditions (i.e., for QP equal to 22, 27, 32 and 37). Under common test conditions, the ratio of luma residual bits and chroma residual bits is around 9:1. With the limitation of chroma QP, rate control algorithms may have difficulty in allocating or finding the desired bit budget balancing point between luma and chroma. In the scenario of low bit-rate applications, rate control algorithms may need to limit chroma bits by increasing chroma QP, while saturating at 39 for chroma QP could change such attempts to unachievable tasks. A second problem is that this property does not allow the codec to properly quantize chroma to the desirable extent.

Another problem for rate control is that the previous observation makes bit-rate much more unpredictable and possibly unstable. In general, for rate control algorithms, a model is needed for bit to QP mapping. Quite commonly, algorithms tend to use luma information (distortion) and ignore chroma. As formerly mentioned, chroma bits at low bit-rates can have a severe impact in the total bit-rate. Additionally, the models used quite commonly follow a quadratic relationship between bitrate and QP. Given the nonlinear behavior of chroma QP that model may be less than accurate.

Video sequences may have color components that might not follow the possibly nonlinear relationship between luma and chroma and their impact on subjective quality that seems to have inspired the chroma QP derivation process. Instead, the present invention provides more flexibility in controlling these QP parameters, handling a more generic content space, while also being able to properly handle other color spaces and formats (e.g. RGB or YCoCg among others). Video coding standards should provide the functionality and flexibility for video sources with different color components or even other color formats (e.g., RGB and YCoCg). When video sources have a different relationship between Luma and Chroma components, assumed by Table 1, the codec may behave unpredictably.

The present invention provides an extended chroma quantization parameter (QP) by replacing or altering the mapping table for determining the chroma QP.

Figure 1:
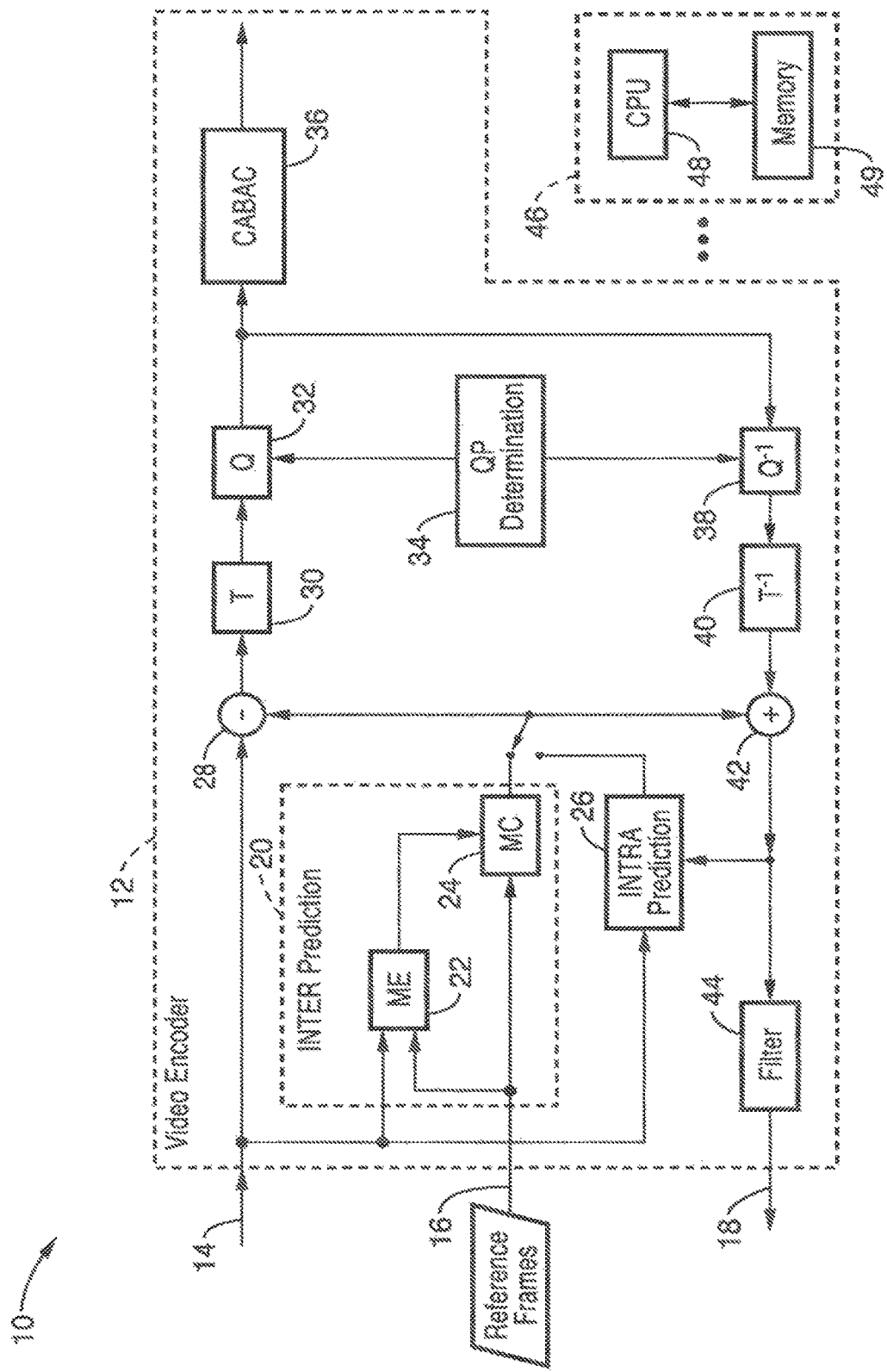
FIG. 1 is a block diagram of extended chroma quantization parameter (ECQP) use in a video encoder according to an embodiment of the present invention.
Figure 2:
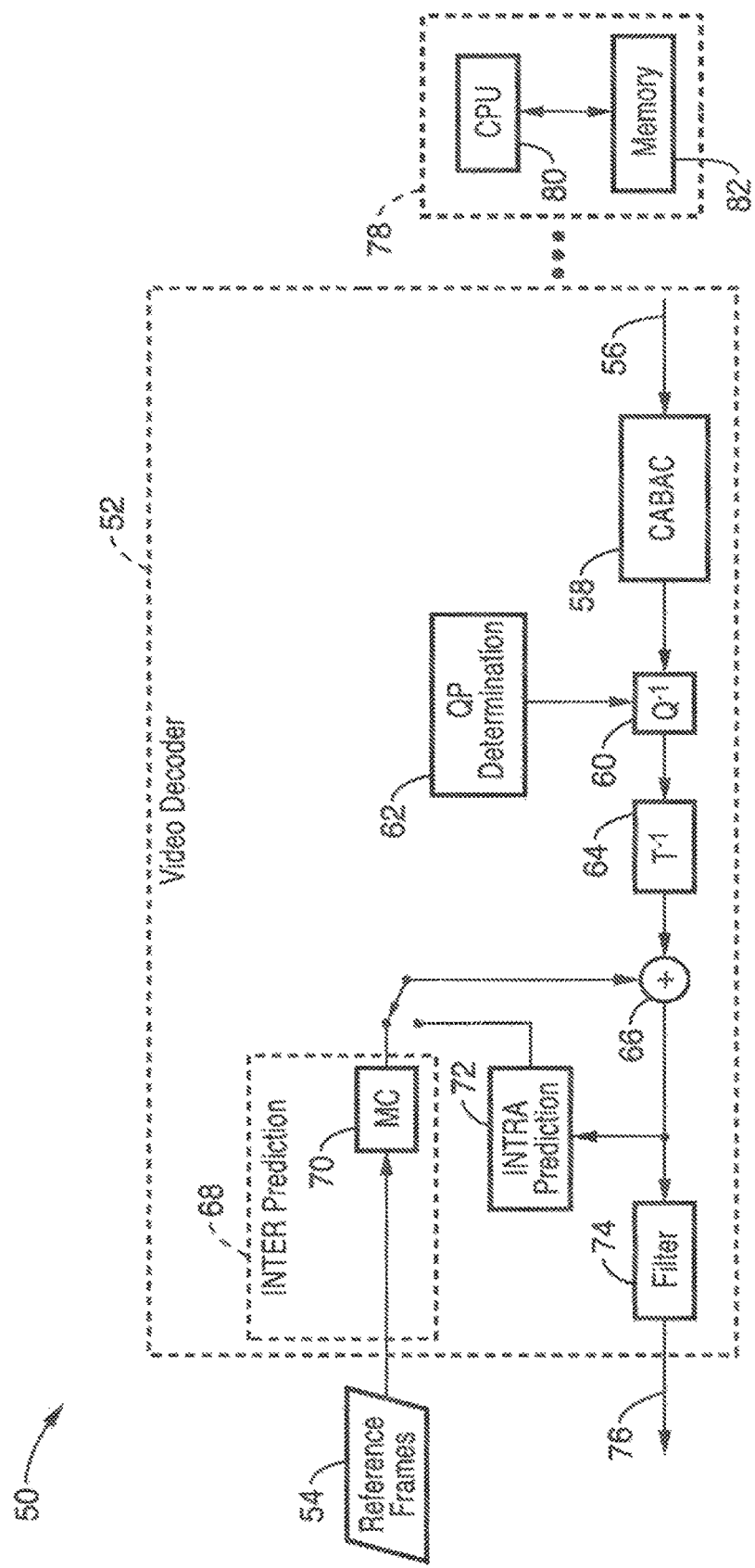
FIG. 2 is a block diagram of extended chroma quantization parameter (ECQP) use in a video decoder according to an embodiment of the present invention.

FIG. 1 through FIG. 2 illustrate example embodiments of a coding apparatus comprising an encoder 10 and decoder 50 configured according to the invention for coding using an extended chroma QP mechanism of the present invention.

The encoder 10 shown in FIG. 1 has encoding elements 12 executed by one or more processors 46. In the example, video frame input 14 is shown along with reference frames 16 and frame output 18. Inter prediction 20 is depicted with motion estimation (ME) 22, and motion compensation (MC) 24. Intra prediction 26 is shown with switching between inter and intra prediction. A sum junction 28 is shown with output to a forward transform 30, quantization stage 32, extended chroma QP determination 34, and CABAC coding 36. An inverse quantization 38 is performed also using the extended chroma QP determination 34, followed by inverse transform 40 shown coupled to a summing junction 42 and followed by a filter 44, such as a deblocking and/or Sample Adaptive Offset (SAO). For the sake of simplicity of illustration, the extended chroma QP determination 34 is shown being utilized during quantization stages, however, it should be appreciated that the extended chroma QP can be utilized by other blocks within the encoder and/or decoder without limitation, such as within the deblocking filter, and while making mode decisions and performing motion estimation.

It should be appreciated that the encoder is shown implemented with a computer processing means 46, such as comprising at least one processing device 48 (central processing unit (CPU), microcontroller, application specific integrated circuit (ASIC) containing a computer processor, parallel processing devices, or other devices configured for executing programmed instructions) and at least one memory 49 for executing programming associated with the encoding. In addition, it will be appreciated that elements of the present invention can be implemented as programming stored on a media, which can be accessed for execution by a CPU for the encoder 10 and/or decoder 50.

In the decoder 50 of FIG. 2, decoding blocks 52 are shown along with a computer processing means 78, which is substantially a subset of the elements contained in the encoder, shown in FIG. 1, operating on reference frames 54 and encoded signal 56 toward outputting a decoded video 76. The decoder blocks receive an encoded video signal 56 which are processed through a CABAC entropy decoder 58, inverse quantization 60 is performed using the extended chroma QP determination 62 according to an embodiment of the invention. Summing 66 is shown between the inverse transform 64 output and the selection between inter prediction 68 shown with motion compensation 70 and intra prediction 72. Output from summing junction 66 is received by filter 74.

It should be appreciated that the decoder can be implemented with a processing means 78 which comprises at least one processing device 80 (central processing unit (CPU), microcontroller, application specific integrated circuit (ASIC) containing a computer processor, parallel processing devices, or other devices configured for executing programmed instructions) and at least one memory 82 for executing programming associated with the encoding. In addition, it will be noted that elements of the present invention can be implemented as programming stored on a media, wherein said media can be accessed for execution by processing device (CPU) 80.

It should be appreciated that the programming for the encoder and decoder is executable from the memory which is a tangible (physical) computer readable media that is non-transitory in that it does not merely constitute a transitory propagating signal, but is actually capable of retaining programming, such as within any desired form and number of static or dynamic memory devices. These memory devices need not be implemented to maintain data under all conditions (e.g., power fail) to be considered herein as non-transitory media.

As previously mentioned, in the current HEVC test model (HM 5.0), the value of chroma QP is derived from luma QP using g_aucChromaScale[52], with chroma QP capable of values in the range of from 0 to 39. However, using that mechanism when luma QP exceeds a value of 48, chroma remains at a value of 39. In response to this a large portion of the bitrate may be used for chroma instead of luma.

Figure 3:
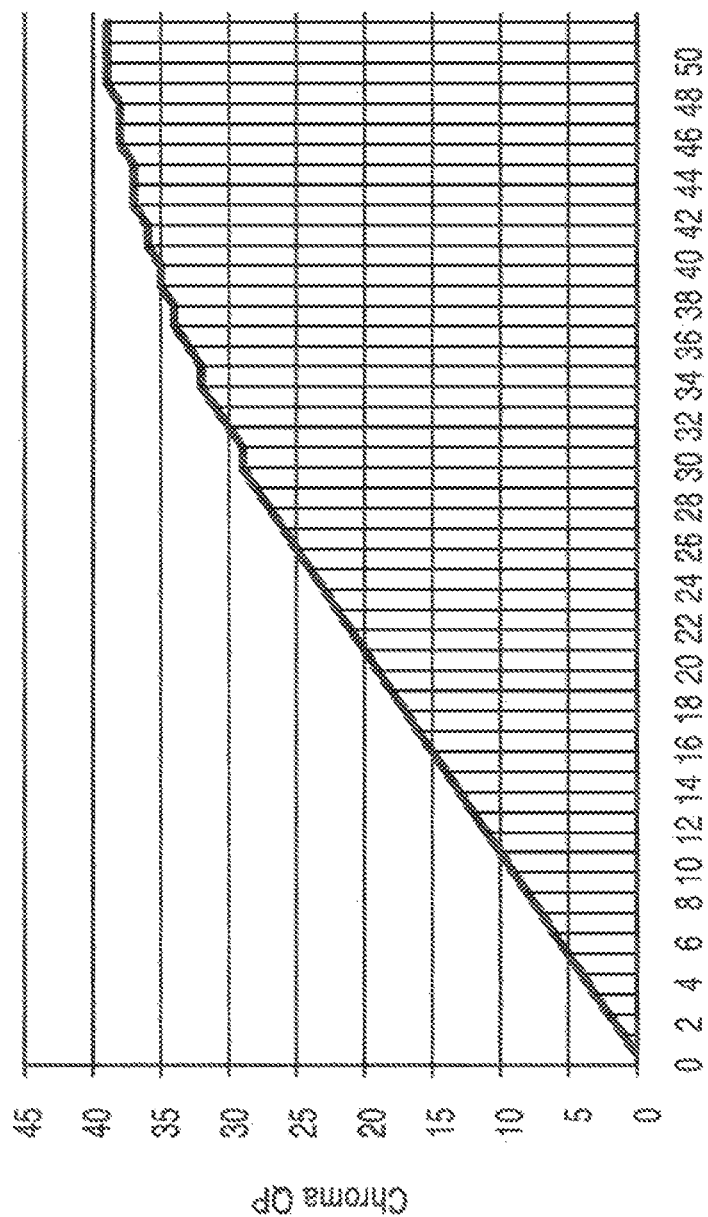
FIG. 3 is a graph of current HEVC HM 5.0 mapping of chroma QP having a lower range than luma QP utilizing the g_aucChromaScale[52] table.

FIG. 3 depicts a graph of chroma QP mapping from luma QP in the current HEVC test model (HM 5.0). It can be seen in this graph that chroma QP is forced away from following luma QP for larger QP values. Statistics indicate, however, that in some cases luma QP and chroma QP remain close, which is not expected.

Figure 4:
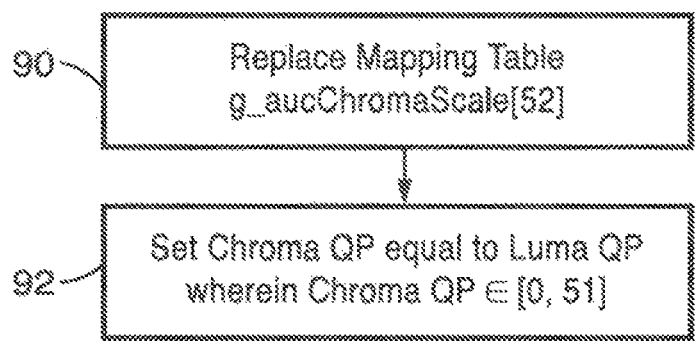
FIG. 4 is a flowchart of a general process for extending the chroma quantization parameter according to at least one embodiment of the present invention.

FIG. 4 illustrates a general strategy for extending chroma QP in which the mapping table g_aucChromaScale[52] is replaced 90, and chroma is extended, such as preferably to have a range which spans that of luma QP. The example flowchart shown with chroma QP being set equal 92 to luma QP (preferably plus chroma offsets), thus allowing chroma QP to attain a range from 0 to 51.

More particularly, the QP values can be determined for the embodiment of FIG. 4 according to the following equations:

$$QP_{Cb}=\text{Clip}(0,51,QP_Y+Cb\_QP\_offset) \quad (1)$$

$$QP_{Cr}=\text{Clip}(0,51,QP_Y+Cr\_QP\_offset) \quad (2)$$

First, it should be noted that in video coding in the YCbCr color space, Y represents the luma component, while and Cb and Cr represent two different chroma components for which quantization parameters are needed ($QP_{Cb}$ and $QP_{Cr}$), although one of ordinary skill in the art will appreciate that the present invention can be readily adapted for use in any desired color space. In eqs. (1) and (2), Cb_QP_offset and Cr_QP_offset are the two Chroma QP offset parameters introduced in the document JCTVC-G509 for Geneva meeting (MPEG number m22073). It has been found that using the extended chroma QPs according to the above embodiment provides beneficial performance enhancement, even with this simplified design.

Figure 5:
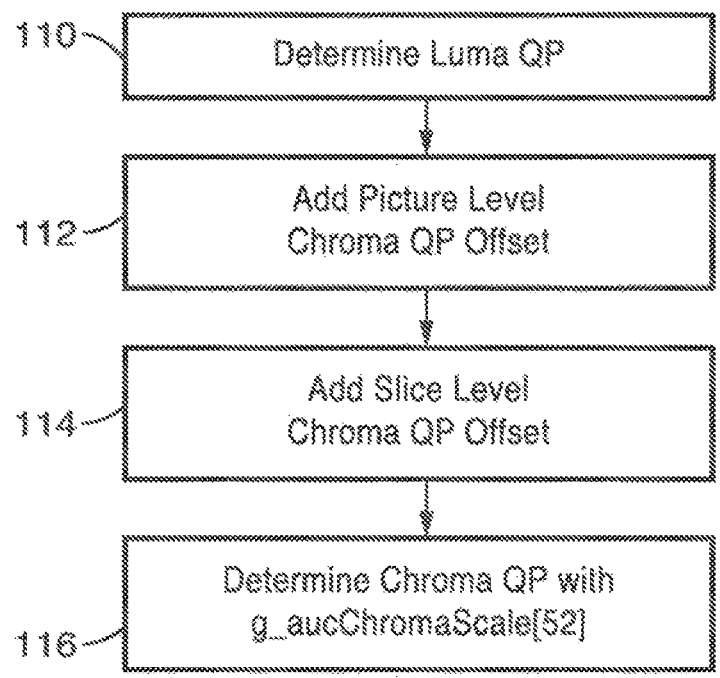
FIG. 5 is a flowchart of a slice level process for extending the chroma quantization parameter according to at least one embodiment of the present invention.

FIG. 5 illustrates an example embodiment of extending chroma QP at the slice level, taking into account signaling at the slice header utilizing slice_qp_delta_cb and slice_qp_delta_cr. First, luma QP is determined 110, then picture level chroma QP offsets are added 112, followed by adding 114 slice level chroma QP offsets, whereafter chroma QP is determined 116 with g_aucChromaScale[52].

Equations (3) and (4) below demonstrate this form of slice level extended chroma QP determination.

$$QP_{Cb}=\text{Clip}(0,51,g\_aucChromaScale[QP_Y+Cb\_QP\_offset+slice\_qp\_delta\_cb] \quad (3)$$

$$QP_{Cr}=\text{Clip}(0,51,g\_aucChromaScale[QP_Y+Cr\_QP\_offset+slice\_qp\_delta\_cr]) \quad (4)$$

The slice level syntax provides for signaling chroma QP offsets (Cb and Cr). The slice level chroma QP extension is particularly well-suited for use in slice level parallel processing within the coding system.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula (e), or computational depiction(s).

From the discussion above it will be appreciated that the invention can be embodied in various ways, including the following:

1. An apparatus for performing video coding, comprising: a computer processor configured for receiving video; and programming executable on said computer processor for video coding by performing steps comprising: performing inter-prediction and/or intra-prediction for reducing temporal and/or spatial redundancies within the received video; determining a luma quantization parameter (QP); adding picture level chroma QP offsets to said luma QP; determining chroma QP values, based on the luma QP and picture level chroma QP offsets, said chroma QP values having an extended range; performing a transform during encoding of said received video and/or performing inverse transform during decoding of said received video; and utilizing said chroma QP values, performing a quantization during encoding of said received video and/or performing inverse quantization during decoding of said received video.

2. The apparatus of any of the previous embodiments, wherein said programming further performs steps comprising adding slice level chroma QP offsets prior to said determination of the chroma QP values.

3. The apparatus of any of the previous embodiments, wherein said programming further performs steps comprising adding slice level chroma QP offsets for an apparatus utilizing slice level parallel processing.

4. The apparatus of any of the previous embodiments, wherein said extended chroma QP range is equal to the luma QP range.

5. The apparatus of any of the previous embodiments, wherein said programming determines the chroma QP values by using the picture level chroma QP offsets for chroma components of a color space with an existing chroma scale table.

6. The apparatus of any of the previous embodiments, wherein the existing chroma scale table comprises g_auc-ChromaScale[52].

7. The apparatus of any of the previous embodiments, wherein said programming determines the chroma QP values by using picture level chroma offsets and replacing an existing chroma scale table.

8. The apparatus of any of the previous embodiments, wherein said video coding is performed according to a High Efficiency Video Coding (HEVC) standard.

9. The apparatus of any of the previous embodiments, wherein said computer processor comprises a coder/decoder (CODEC).

10. An apparatus for performing video coding, comprising: a computer processor configured for receiving video; and programming executable on said computer processor for video coding by performing steps comprising: performing inter-prediction and/or intra-prediction for reducing temporal and/or spatial redundancies within the received video; determining a luma quantization parameter (QP); adding picture level chroma QP offsets for Cb and Cr to said luma QP; adding slice level chroma QP offsets for Cb and Cr to said luma QP; determining chroma QP values for Cb and Cr, based on the luma QP, as well as picture level and slice level chroma QP offsets for Cb and Cr, wherein said chroma QP values have a QP range equal to the luma QP; performing a transform during encoding of said received video, and/or inverse transform during decoding of said received video; utilizing said chroma QP values for Cb and Cr, performing quantization during encoding of said received video, and/or performing inverse quantization during decoding of said received video.

11. The apparatus of any of the previous embodiments, wherein during decoding said received video comprises an encoded video.

12. The apparatus of any of the previous embodiments, wherein said apparatus is configured for slice level parallel processing.

13. The apparatus of any of the previous embodiments, wherein said programming determines the chroma QP values using the picture level and slice level chroma QP offsets for Cb and Cr with an existing chroma scale table.

14. The apparatus of any of the previous embodiments, wherein the existing chroma scale table comprises g_auc-ChromaScale[52].

15. The apparatus of any of the previous embodiments, wherein said programming determines chroma QP using luma QP as well as the picture level and slice level chroma QP offsets for Cb and Cr, and replacing an existing chroma scale table.

16. The apparatus of any of the previous embodiments, wherein said video coding is performed according to a High Efficiency Video Coding (HEVC) standard.

17. The apparatus of any of the previous embodiments, wherein said computer processor comprises a coder/decoder (CODEC).

18. A method of performing video coding, comprising: performing inter-prediction and/or intra-prediction for reducing temporal and/or spatial redundancies of received video within a video encoder and/or decoder; determining a luma quantization parameter (QP); adding picture level chroma QP offsets for Cb and Cr; adding slice level chroma QP offsets for Cb and Cr; determining extended chroma QP values for Cb and Cr based on the luma QP and picture level and slice level chroma QP offsets for Cb and Cr; and performing a transform during encoding of said received video and/or performing an inverse transform during decoding of said received video; and utilizing said chroma QP values for Cb and Cr, performing quantization during encoding of said received video, and/or performing inverse quantization during decoding of said received video.

19. The method of any of the previous embodiments, wherein said chroma QP vales have a range equal to the luma QP range.

20. The method of any of the previous embodiments, wherein said determining of the chroma QP is performed using the picture level and slice level chroma QP offsets for Cb and Cr, either with an existing chroma scale table, or by replacing the existing chroma scale table.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Specification of $QP_C$ as a function of $QP_Y$

| | $QP_Y$ | | | | | | | | | | |
|---|---|---|---|---|---|---|---|---|---|---|---|
| | <30 | 30 | 31 | 32 | 33 | 34 | 35 | 36 | 37 | 38 | 39 |
| $QP_C$ | =$QP_Y$ | 29 | 30 | 31 | 32 | 32 | 33 | 34 | 34 | 35 | 35 |
| | $QP_Y$ | | | | | | | | | | |
| | 40 | 41 | 42 | 43 | 44 | 45 | 46 | 47 | 48 | 49 | 50 | 51 |
| $QP_C$ | 36 | 36 | 37 | 37 | 37 | 38 | 38 | 38 | 39 | 39 | 39 | 39 |

What is claimed is:

1. A decoding apparatus, comprising:
    circuitry configured to:
    set a chroma quantization parameter (QP) included in a chroma QP range from 0 to 51 equal to a luma QP range from 0 to 51, based on a parameter including a picture level chroma QP offset and a slice level chroma QP offset added to a luma QP; and
    inversely quantize quantization data that is decoded from a bit stream, based on the chroma QP.

2. The decoding apparatus of claim 1, wherein said circuitry is further configured to set the chroma QP based on a mapping table that maps the chroma QP to the parameter.

3. The decoding apparatus of claim 2, wherein said circuitry is further configured to decode the bit stream to generate the quantization data.

4. A decoding method, comprising:
   setting a chroma quantization parameter (QP) included in a chroma QP range from 0 to 51 equal to a luma QP range from 0 to 51, based on a parameter including a picture level chroma QP offset and a slice level chroma QP offset added to a luma QP; and
   performing inverse quantization on quantization data that is decoded from a bit stream, based on the chroma QP.

5. The decoding method of claim 4, further comprising setting the chroma QP based on a mapping table that maps the chroma QP to the parameter.

6. The decoding method of claim 5, further comprising decoding the bit stream to generate the quantization data.

* * * * *